(12) United States Patent
Desjoyeaux et al.

(10) Patent No.: US 12,698,739 B2
(45) Date of Patent: Aug. 4, 2026

(54) OPTIMISED HONEYCOMB CORE AND ACOUSTIC ATTENUATION PANEL COMPRISING IT FOR AN AIRCRAFT TURBOMACHINE

(71) Applicant: SAFRAN NACELLES, Gonfreville l'Orcher (FR)

(72) Inventors: Bertrand Leon Marie Desjoyeaux, Moissy-Cramayel (FR); Marc Versaevel, Moissy-Cramayel (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 257 days.

(21) Appl. No.: 18/528,974

(22) Filed: Dec. 5, 2023

(65) Prior Publication Data

US 2024/0191655 A1 Jun. 13, 2024

(30) Foreign Application Priority Data

Dec. 7, 2022 (FR) ...................................... 2212932

(51) Int. Cl.
F02C 7/045 (2006.01)
B64D 33/02 (2006.01)
(Continued)

(52) U.S. Cl.
CPC .............. F02C 7/045 (2013.01); F02K 1/827 (2013.01); B64D 2033/0206 (2013.01);
(Continued)

(58) Field of Classification Search
CPC . F02C 7/045; F02K 1/827; B64D 2033/0206; F05D 2250/283; F05D 2260/96; F05D 2300/603; G10K 11/168
See application file for complete search history.

(56) References Cited

U.S. PATENT DOCUMENTS 5,997,985 A * 12/1999 Clarke ...................... B32B 3/12
                                                            428/116
6,274,216 B1 * 8/2001 Gonidec ................... B32B 5/02
                                                            428/116
(Continued)

FOREIGN PATENT DOCUMENTS

EP          3614373 A2    2/2020
FR          3070529 A1    3/2019
(Continued)

OTHER PUBLICATIONS

Preliminary Research Report received for French Application No. 2212932, mailed on May 23, 2023, pages (1 page of French Translation Cover Sheet and 4 pages of original document).

*Primary Examiner* — Forrest M Phillips
(74) *Attorney, Agent, or Firm* — WOMBLE BOND DICKINSON (US) LLP

(57) ABSTRACT

A core for an acoustic attenuation panel extending between a first and a second end face, the core including a plurality of tubular polygonal cells having a main axis of extension between the end faces, each cell including an internal cavity delimited by lateral walls extending between the first and second end faces and opening out into each of the two end faces, the cells being expandable in a direction parallel to the end faces, each polygonal cell having septa extending transversely relative to the main axis and being offset there along, wherein each septum is folded in a W-shape at least between one of the lateral walls and another of the lateral walls and has a through orifice, the orifices of two consecutive septa being offset radially with respect to the main axis to form a baffle.

13 Claims, 7 Drawing Sheets

(51) Int. Cl.
  *F02K 1/82* (2006.01)
  *G10K 11/168* (2006.01)
(52) U.S. Cl.
  CPC .... *F05D 2250/283* (2013.01); *F05D 2260/96*
    (2013.01); *F05D 2300/603* (2013.01); *G10K*
    *11/168* (2013.01)

(56) References Cited

U.S. PATENT DOCUMENTS

| | | | | |
|---|---|---|---|---|
| 9,476,359 | B2 * | 10/2016 | Soria ................... | G10K 11/172 |
| 9,752,595 | B2 * | 9/2017 | Alonso-Miralles ... | F04D 29/522 |
| 10,332,501 | B2 * | 6/2019 | Lin .......................... | B32B 7/12 |
| 11,286,957 | B2 * | 3/2022 | Alonso-Miralles ..... | B32B 15/20 |
| 11,686,247 | B2 * | 6/2023 | Desjoyeaux ........... | G10K 11/16 |
| | | | | 415/119 |
| 12,106,744 | B2 * | 10/2024 | Ravise ...................... | B32B 5/18 |
| 2012/0037449 | A1 | 2/2012 | Ayle | |
| 2013/0299274 | A1 * | 11/2013 | Ayle ....................... | B64D 29/00 |
| | | | | 181/292 |
| 2020/0063691 | A1 | 2/2020 | Kruckenberg | |
| 2020/0200084 | A1 * | 6/2020 | Desjoyeaux ........... | B64D 33/02 |
| 2020/0276641 | A1 * | 9/2020 | Benard .................. | F02C 7/047 |

FOREIGN PATENT DOCUMENTS

| | | | |
|---|---|---|---|
| FR | 3070530 | A1 | 3/2019 |
| WO | 2019/043344 | A1 | 3/2019 |

* cited by examiner

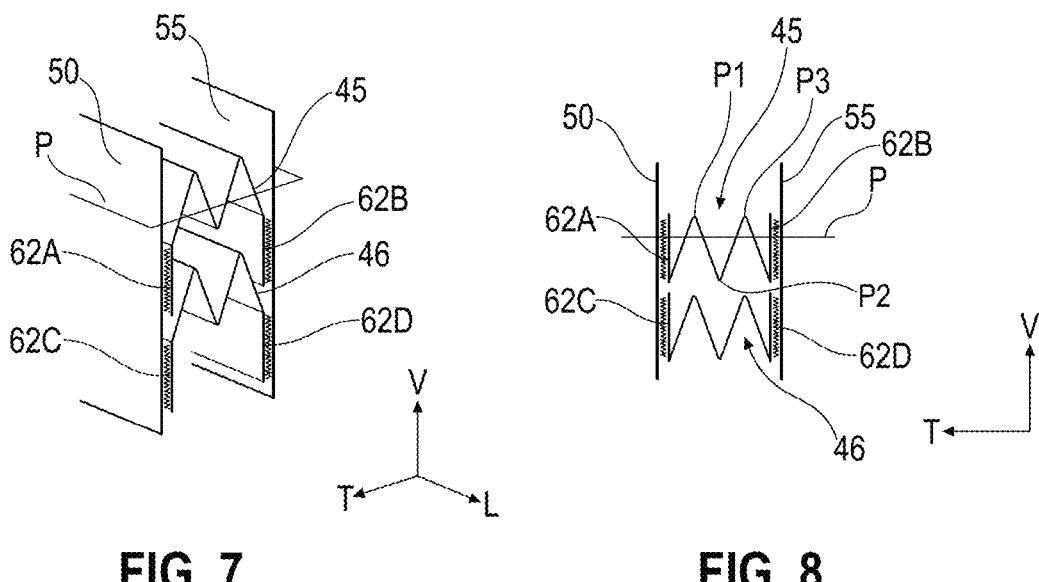
FIG. 7          FIG. 8
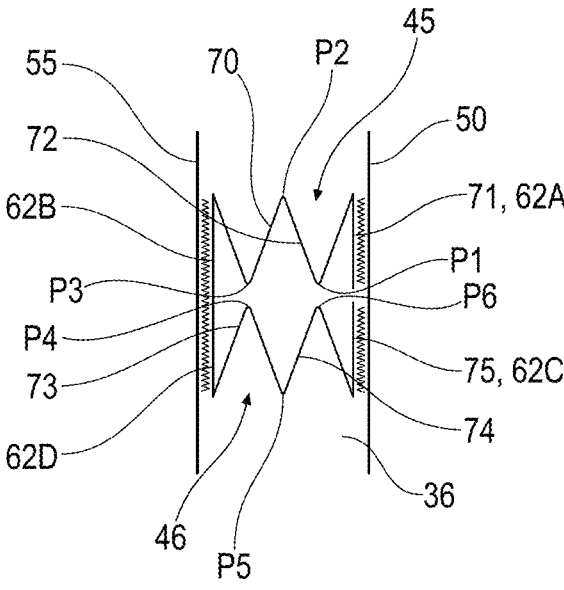
FIG. 9

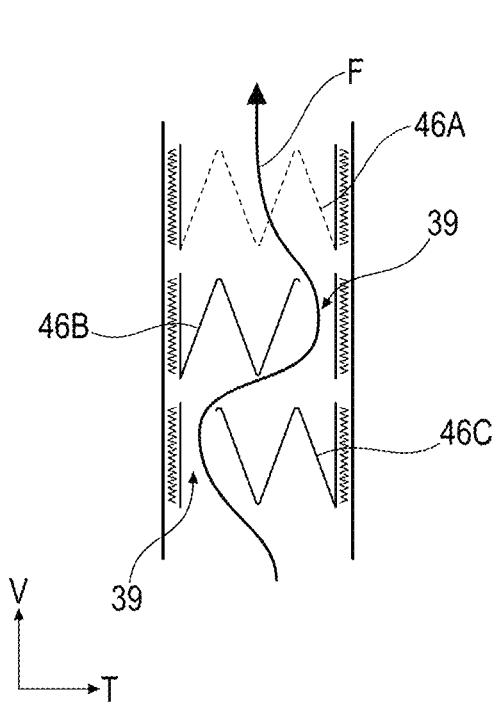
FIG. 14          FIG. 15
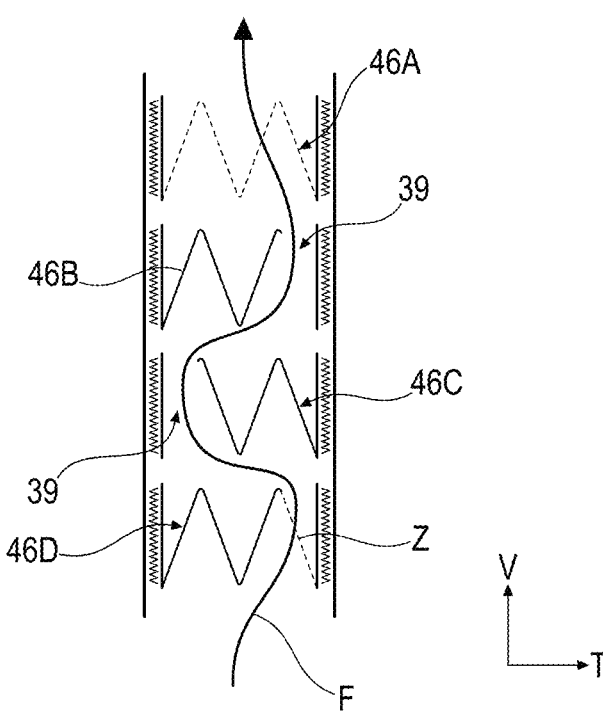
FIG. 16

OPTIMISED HONEYCOMB CORE AND ACOUSTIC ATTENUATION PANEL COMPRISING IT FOR AN AIRCRAFT TURBOMACHINE

TECHNICAL FIELD

This invention relates to a honeycomb core for an acoustic attenuation panel and an acoustic panel comprising this honeycomb core for an aircraft turbomachine.

PRIOR ART

The acoustic attenuation panels are widely used in the turbomachines for lining areas subject to significant gas flow, such as a fan casing or a secondary flow duct located downstream of the fan through which air circulates, or an exhaust nozzle or an exhaust cone for the turbomachine, referred to as the acronym "plug", subject to exhaust gas flow.

These acoustic attenuation panels are generally made in the form of sandwiches comprising at least a first external skin wall, a second internal skin wall and a core trapped between these first and second skin walls. The core comprises a plurality of tubular polygonal cells, each of which has an inclined orientation relative to the first and second skin walls or perpendicular to the first and second skin walls. These cores are generally made in the form of a plate of honeycomb material with hexagonal cells. These cells are hollow over their entire height. Thus, in the sense of the invention, a honeycomb structure/core is an array of hollow cells formed between thin vertical walls.

The height of the cells is an essential parameter that determines the capacity of the panel to absorb the sound waves. It has been shown that sound wave absorption is optimal for a conventional panel when the cells have a height corresponding approximately to a quarter of the wavelength k of the sound wave to be treated.

At present, for reasons of integration and compactness, it is desirable to produce acoustic attenuation panels that are thinner than the conventional panels. However, it is not possible to reduce the height of the cells without losing the capacity of the panel to absorb the sound waves.

It has also been found that the capacity of a cell to absorb an acoustic wave of wavelength k is directly dependent on the length of the path travelled by the acoustic wave in the cell, i.e., according to the above, a length corresponding to a quarter of the wavelength, i.e., $\lambda/4$. However, it has also been found that the length of this path does not necessarily have to follow a straight path. In other words, the acoustic wave can be effectively absorbed as long as the total length of the path travelled is close to $\lambda/4$, but this length can be distributed along a non-rectilinear path.

The patents FR-3 070 529-B1 and FR-3 070 530-B1 propose an acoustic panel that has a limited thickness while being suitable for attenuating the low frequencies. In particular, said acoustic panel comprises cells housing at least one partial obstacle which extends transversely to the main axis of the cell concerned to increase the length of the path travelled by the sound waves through the cell. Each obstacle has a free end edge which defines a passage with a portion of the opposite cell wall.

For the same height and with no loss of acoustic surface area, this type of acoustic panel can attenuate lower noise frequencies, thereby reducing the overall dimension of the acoustic panel and its weight.

The patents FR-3 070 529-B1 and FR-3 070 530-B1 also propose methods that are particularly suitable for the manufacture of such acoustic panels. In particular, an obstacle in a cell is formed from a ribbon attached between two plates. The ribbon is shaped in particular by folding along fold lines between the two plates intended to form the peripheral walls of the cells of a core. The obstacle is formed by exerting a tensile force on the plates attached to each other, tending to push the plates apart. This tensile force, combined with the gluing of the plates by nodal portions and the folded areas provided on the plates, allows the plates to be shaped to form the cells of the honeycomb core.

However, the number of baffles created by the folds between the obstacles in a cavity mentioned in these patents is too low and limits the capacity to reduce the height of the honeycomb core.

There is therefore a real need for an acoustic absorbing panel that is thinner than a conventional panel, yet retains the same level of acoustic attenuation or even improves it.

The aim of the present invention is therefore to propose a honeycomb core and an acoustic absorbing panel comprising it, allowing to overcome at least some of these disadvantages.

SUMMARY OF THE INVENTION

To this end, the invention relates to a honeycomb core for an acoustic attenuation panel extending between a first and a second end faces, said core comprising a plurality of tubular polygonal cells having a main axis of extension between the end faces, each cell comprising an internal cavity delimited by lateral walls extending between the first and second end faces and opening into each of the two end faces, the cells being expandable in a direction parallel to the end faces, each polygonal cell comprising septa extending transversely with respect to the main axis of the associated cell and being offset along the main axis.

According to the invention, each septum is folded in a W shape at least between one of the lateral walls and another of the lateral walls and has a through orifice, the orifices of two consecutive septa being offset radially with respect to the main axis to form a baffle.

In this way, the invention allows to incorporate more partial transverse obstacles in the same height of honeycomb core and therefore to increase the length of the path travelled by the sound waves through the cell.

The invention allows to reduce the distance between two successive transverse partitions thanks to the W-shaped folding of each septum or transverse partial partition equipped with a through orifice, which has a reduced height compared to a V-shaped folding.

The invention thus allows, for the same height, to create an air passage path that is longer than the simple height of the core, and by combining the core with two skins to attenuate lower noise frequencies or to reduce the height of the cells while attenuating the same target frequencies effectively. As a result, the invention allows to limit the overall dimension of the acoustic panel and its weight.

The honeycomb core according to the invention may comprise one or more of the following characteristics, taken on their own or in combination with each other in any technically possible combination:

each polygonal cell is formed from a first plate and a
        second plate attached together by nodal portions, and
        the septa each extend through the nodal portions of the
        first and second plates;
    two consecutive septa are independent of each other;

each septum comprises a first attachment leg attached to a non-nodal portion of the first plate and a second attachment leg attached to a non-nodal portion of the second plate, the first and second attachment legs each extending towards an end of the associated cell;

each septum extends transversely between its first attachment leg and its second attachment leg;

each septum is offset along the main axis with respect to its first and second attachment legs;

the core comprises an additional ribbon arranged between the first and the second plates, attached to the first and to the second plates and shaped to form at least two consecutive septa;

two consecutive septa are formed from an additional ribbon, said additional ribbon comprising: a first portion glued to the first plate and forming a first attachment leg for attaching a first of the septa to a non-nodal portion of the first plate, a first adjacent portion folded along three fold lines, a second portion glued to the second plate and continuously forming a second attachment leg for attaching the first septum and a first attachment leg for attaching the second of the septa to a non-nodal portion of the second plate, a second adjacent portion folded along three fold lines, and a third portion glued to the first plate and forming a second attachment leg for attaching the second septum to a non-nodal portion of the first plate;

the additional ribbon is shaped to continuously form consecutive septa, the additional ribbon comprising a succession of portions glued alternately to the first plate or to the second plate and portions folded along three fold lines;

at least one of the septa comprises at least one segment of acoustically permeable material.

The invention also relates to an acoustic panel for a turbomachine comprising a first skin wall, a second skin wall and a core in accordance with the invention and as described above, the core being arranged between the first and second skin walls and secured to at least one of the skin walls, the first skin wall being acoustically permeable and the second skin wall being acoustically opaque.

In one embodiment, the core is secured to the first external skin wall and to the second internal skin wall.

Alternatively, the core is attached to only one of the skin walls: the first external skin wall or the second internal skin wall, the other of the walls not being secured to the core.

The invention also relates to an aircraft propulsion assembly turbomachine, comprising at least one acoustic panel according to the invention and as described above.

BRIEF DESCRIPTION OF FIGURES

The invention will be better understood and other details, characteristics and advantages of the present invention will become clearer from the following description made by way of non-limiting example and with reference to the attached drawings, in which:

FIG. 7 is a perspective view of an example of a cell equipped with two septa according to the invention;

FIG. 8 is a cross-sectional view of another example of a cell equipped with two septa according to the invention;

FIG. 9 is a cross-sectional view of another example of a cell equipped with two septa according to the invention;

FIG. 14 shows schematically an example of a cell of an acoustic panel according to the invention;

FIG. 15 shows schematically another example of a cell of an acoustic panel according to the invention; and FIG. 16 shows schematically another example of a cell of an acoustic panel according to the invention.

The elements having the same functions in the different embodiments have the same references in the figures.

In the description and the claims, the terms longitudinal, vertical and transverse will be adopted with reference to the L, V, T trihedron shown in the figures.

DESCRIPTION OF THE EMBODIMENTS

The invention applies to any turbomachine intended to be mounted on an aircraft.

Figure 1:
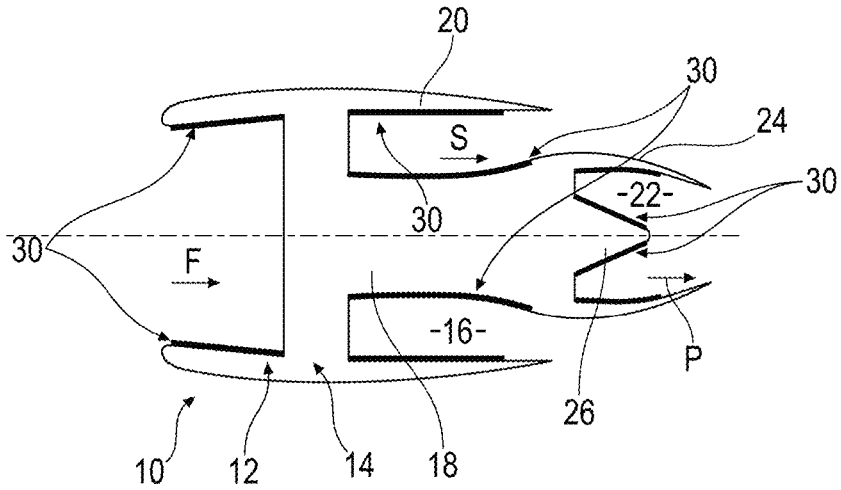
FIG. 1 is a schematic view of the locations of acoustic attenuation panels in a turbomachine.

FIG. 1 shows a schematic representation of such a turbomachine 10 and in particular a nacelle of the turbomachine. The turbomachine 10 comprises, from upstream to downstream, a fan casing 12, an intermediate casing 14, a secondary flow channel 16 delimited by an internal casing 18 and by an external casing 20, and a nozzle 22 delimited by an exhaust casing 24 and by an exhaust cone 26 (also known as "plug").

The fan casing 12 is passed through by an incoming air flow F, the secondary flow channel 16 is passed through by a secondary air flow S and the nozzle 22 allows the ejection of a primary gas flow P. These different flows F, S, P, can propagate acoustic waves from the rotating portions of the turbomachine, such as the fan, the compressors and the turbines.

To reduce this noise, the fan casing 12, the secondary flow channel 16 and the nozzle 22 can have their walls covered with acoustic attenuation panels. For example, the fan casing 12, the internal casing 18 and the external casing 20, the exhaust casing 24 and the exhaust cone 26 can be covered by acoustic attenuation panels 30, shown schematically in bold lines in FIG. 1. The acoustic attenuation panels 30 are designed to attenuate the noise emitted by the members of the turbomachine 10 that are housed in the nacelle, such as an engine or a fan (not shown).

Some or all of these, or other acoustic panels, may be totally or partially equipped with honeycomb cores in accordance with the invention.

Figure 2:
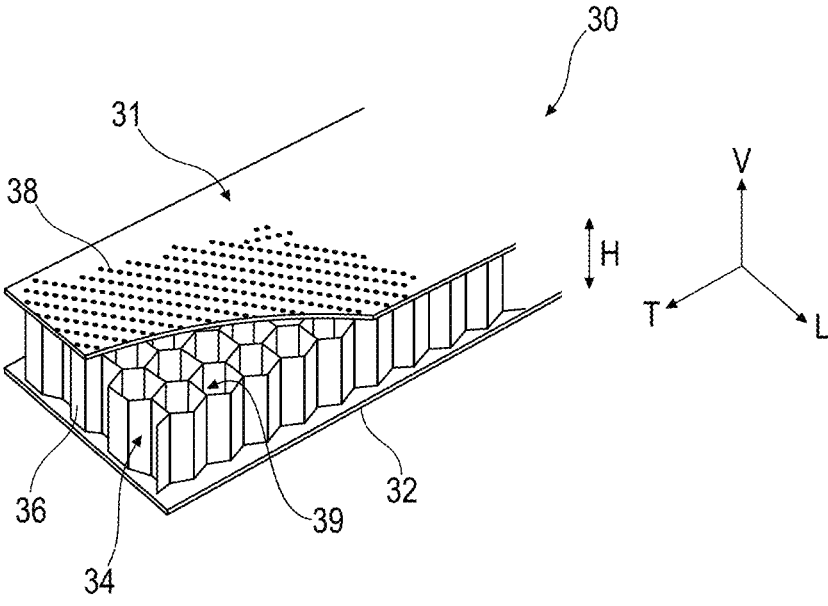
FIG. 2 is a perspective view of an acoustic attenuation panel according to the invention.

As illustrated in FIG. 2, such a panel 30 according to the invention is generally made in the form of a sandwich comprising in its simplest form, from front to rear along the vertical axis V, at least a first external skin wall 31, a second internal skin wall 32, and at least one honeycomb core 34. Of course, the sandwich can comprise other intermediate layers and in particular other cores superimposed on the core 34.

In a known way, the core is attached to the first external skin wall and to the second internal skin wall. Alternatively, the core can be attached to only one of the skin walls: the first external skin wall or the second internal skin wall, the other of the walls not being secured to the core. The core is secured to one or both skin walls by screwing, riveting, gluing or welding.

The core 34 extends between a first end face 41 and a second end face 42.

The core 34 comprises a plurality of tubular polygonal cells 36 which each have an orientation along a main axis A of extension between the first and second end faces. In the examples shown and in the rest of the description, the main axis A is perpendicular to the first and second end faces, and therefore to the first and second skin walls 31, 32. However, the invention also applies to a core in which the main axis A of the polygonal cells is inclined with respect to the first and second end faces without being perpendicular thereto, for example at an angle of between 0° and 45° to the normal to one of the end faces.

In other words, each cell 36 extends along a vertical main axis A, corresponding generally to an axis of propagation of the sound waves, from a front end 41 of the cell 36 resting on the first external skin wall 31, to a rear end 42 resting on the second external skin wall 42.

The cells 36 are joined together transversely and longitudinally to form a hollow structure. Such a core 34 is generally made in the form of a plate of material with polygonal cells 36, which are hollow over their entire height H. In the example shown, the core 34 is made in the form of a plate of honeycomb material with hexagonal cells 36, which are hollow over their entire height H.

The first external skin wall 31 comprises a plurality of holes 38 which open into the cells 36. The sound waves enter the cells 36 through these holes 38 where they are partly trapped and thus attenuated. Alternatively, the first external skin wall 31 has a permeability formed by a grating adapted to allow the sound waves to penetrate the honeycomb core 34. In other words, the first external skin wall 31 is acoustically opaque.

The second internal skin wall 32 is solid. In other words, the second internal skin wall 32 is acoustically permeable.

The first external skin wall 31 and the second internal skin wall 32 extend substantially parallel to each other and transversely. Substantially parallel means that the angle between the first external skin wall 31 and the second internal skin wall 32 is less than 10°, preferably less than 5°. The vertical direction V is substantially perpendicular to the local surface of the first external skin wall 31.

Each cell 36 comprises an internal cavity 39 delimited by lateral walls extending between the first and second skin walls 31, 32 and perpendicular (in the examples illustrated) to the first and second skin walls 31, 32. In other words, the longitudinal walls 40 extend substantially parallel to the vertical direction V from the first skin wall 31 to the second skin wall 32. The internal cavity 39 communicates with at least one of the holes 38 formed in the first skin wall 31.

However, in the case where the main axis A of the polygonal cells is inclined with respect to the first and second end faces, the longitudinal walls 40 extend substantially parallel to the main axis A from the first skin wall 31 to the second skin wall 32.

Figure 3:
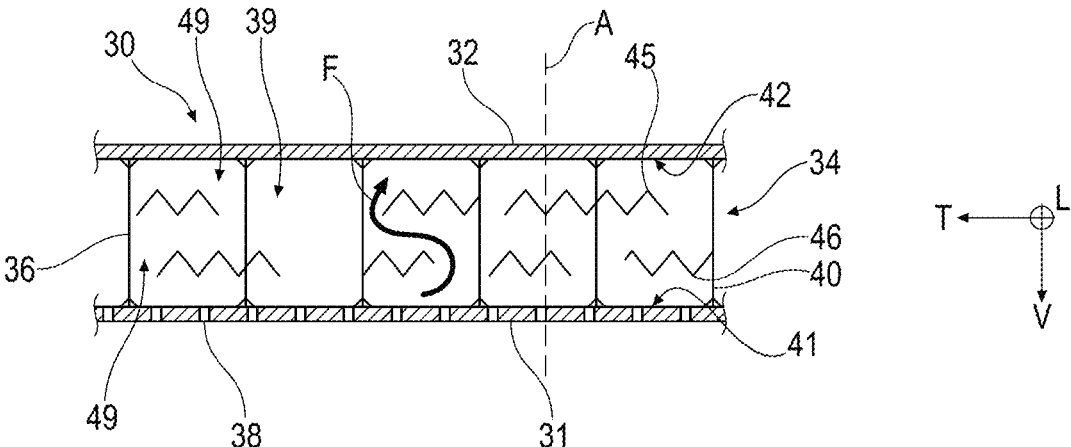
FIG. 3 is a schematic cross-sectional view showing the cells of one of the acoustic panels in FIG. 2 equipped with a number of locally perforated septa forming a baffle.

With reference to FIG. 3, which is a schematic cross-sectional view illustrating the cells of one of the acoustic panels of FIG. 2, according to the invention, each polygonal cell comprises at least two septa 45, 46 each extending generally transversely with respect to the main axis A of the associated cell from a lateral wall 40 of the cell. The septa 45, 46 each extend generally perpendicular to the main axis A of the associated cell. More specifically, the mean plane of each septum is perpendicular to the main axis A of the associated cell.

The two septa are offset in depth along the main longitudinal axis A of the associated cell 36.

Within the meaning of the invention and in the rest of the description, a septum is by definition an obstacle arranged in a cell of the honeycomb core, secured to several walls delimiting the cell and extending in a transverse direction with respect to the main axis A of the cell. The septa can take different forms: an acoustically opaque obturator having a local free passage, a partially acoustically opaque obstacle comprising a segment of acoustically permeable surface (for example in the form of a micro-grating or a finely perforated area with holes of diameter generally between 0.2 and 0.4 mm for an aperture ratio generally between 0.5% and 5%), an obstacle acoustically permeable over the whole of the surface delimited between the walls of the cell (for example in the form of a micro-grating or a finely perforated film). The septum is thus at least locally, i.e., in segments, transparent to certain frequency ranges and impermeable to frequency ranges.

In addition, each septum 45, 46 which is not entirely acoustically permeable has a through orifice 49 or a local acoustically permeable area, the orifices of two successive septa being offset radially with respect to the main axis A to form a baffle for the propagation of the sound waves. The relative position of the orifices passing through two consecutive septa is chosen so as to obtain path lengths for the sound waves to be attenuated that are compatible with their frequency. In this way, the sound waves follow a sinuous trajectory (arrow F) between the septa 45, 46 from the front end 41 to the rear end 42 of the associated cell 36. This sinuous trajectory is therefore longer than the straight line distance between the two end faces, front 41 and rear 42.

Figure 6:
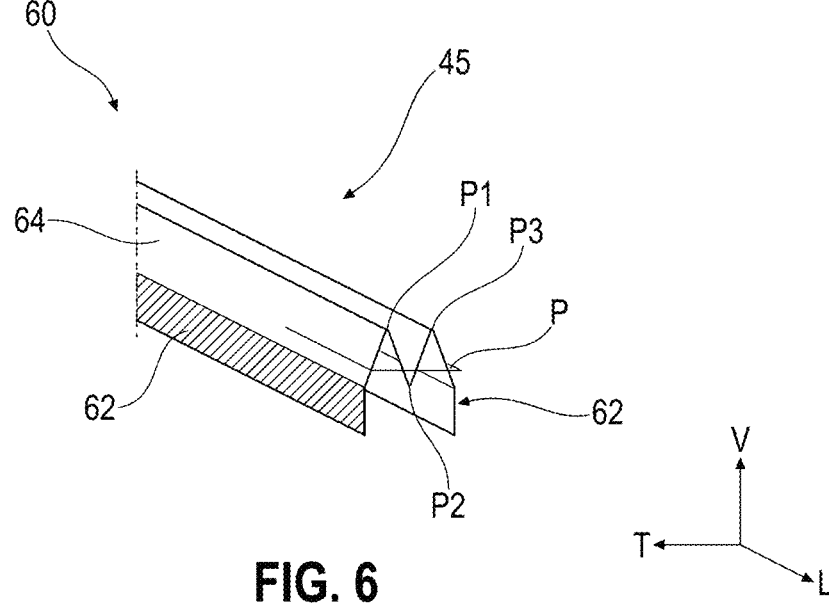
FIG. 6 is a perspective view of a W-shaped septum intended to a cell of the core of an acoustic attenuation panel according to the invention.

In addition, each septum 45, 46 is folded in a W-shape at least between one of the lateral walls and another of the lateral walls, preferably not adjacent. Preferably, each septum 45, 46 is folded in a W shape between at least two opposite lateral walls, i.e., arranged opposite each other. In other words, each septum 45, 46 has at least three folds P1, P2, P3 along fold lines parallel to each other, two consecutive fold lines being arranged on either side of the mean plane P of the associated septum. Such a septum is illustrated in FIG. 6. Thus, the fold lines P1 and P3 are on one side of the plane P and the fold line P2 is on the other side of the plane P.

Such a honeycomb core 34 is advantageously obtained by forming each cell 36 from two plates 50, 55 and at least one ribbon 60 to form the septa. Of course, several consecutive cells can be formed from these two plates 50 and one or more ribbons 60.

More specifically, each cell 36 is formed from a first plate 50 and a second plate 55 attached together by nodal portions. Each plate also comprises portions referred to as non-nodal portions intended to form walls delimiting the cells of the honeycomb core.

The ribbons 60 or septa 45, 46 also comprise several functional areas, in particular at least one attachment area 62 (hatched area of the ribbon) and an area referred to as free area 64, with reference to FIG. 6. The free area 64 has at least three folds P1, P2 and P3.

Firstly, each attachment area 62 associated with the first plate 50 of the ribbon 60 is attached to the first plate 50, for example by gluing, soldering or welding during a step of attaching the ribbon to the first plate 50.

In a similar way, each attachment area 62 associated with the second plate 55 of the ribbon 60 is attached to the second plate 55, for example by gluing, soldering or welding during a step of attaching the ribbon to the second plate 55.

Then, during a step of attaching the second plate 55 to the first plate 50, the nodal portions 56 of the first plate 50 are attached, for example by gluing, brazing or welding, to nodal portions 56 of the second plate 55 located opposite the nodal portions 56 of the first plate 50.

Finally, during a forming step, the non-nodal portions of the first and of the second plates 50, 55 are shaped by expansion so that each non-nodal portion constitutes, with an opposite non-nodal portion of the second plate, the lateral walls delimiting a corresponding cell of the honeycomb core, and so that at least one portion of the ribbon or of the ribbons forms the at least two septa 45, 46 in this cell.

Figure 12:
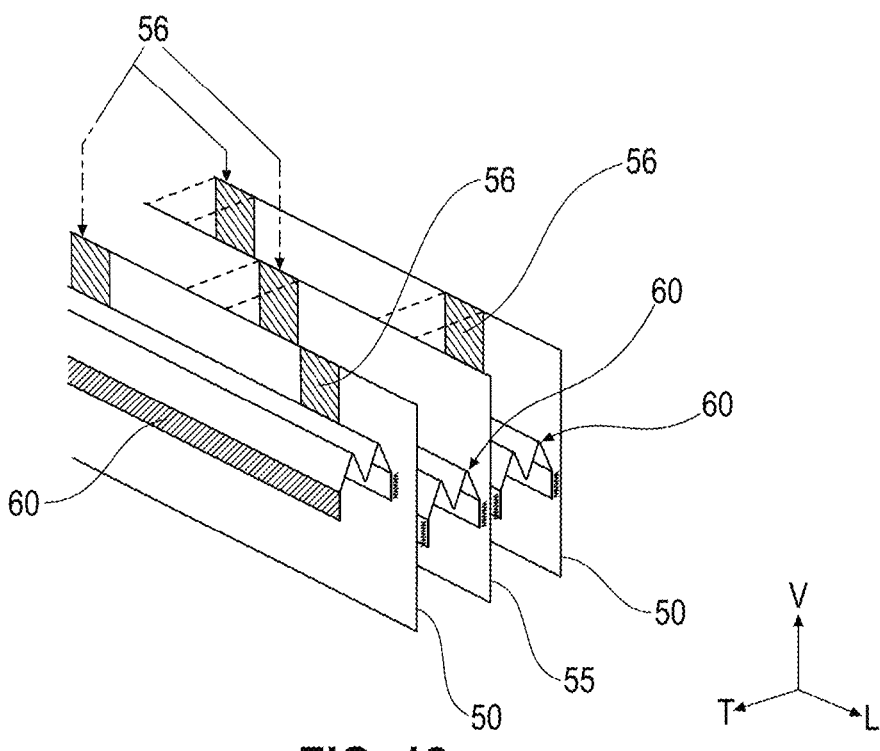
FIG. 12 shows schematically an example of how the ribbon is attached to the plates.

In a first embodiment illustrated in FIG. 12, a ribbon 60 extends between several successive cells delimited by the plates 50 and 55, passing through the nodal areas 56 connecting the plates 50 and 55 and separating said cells. Preferably in this case, at the nodal area 56 between 50 and 55, all the faces of the ribbon are attached to each other and to the plates 50 and 55 in order to maintain the uniqueness of the nodal area 56. Alternatively, the plates 50 and 55 are bonded together only in areas where the ribbon 60 does not obstruct the bonding between the plates 50 and 55. In other words, in this alternative case, the plates are directly secured to each other.

Figure 13:
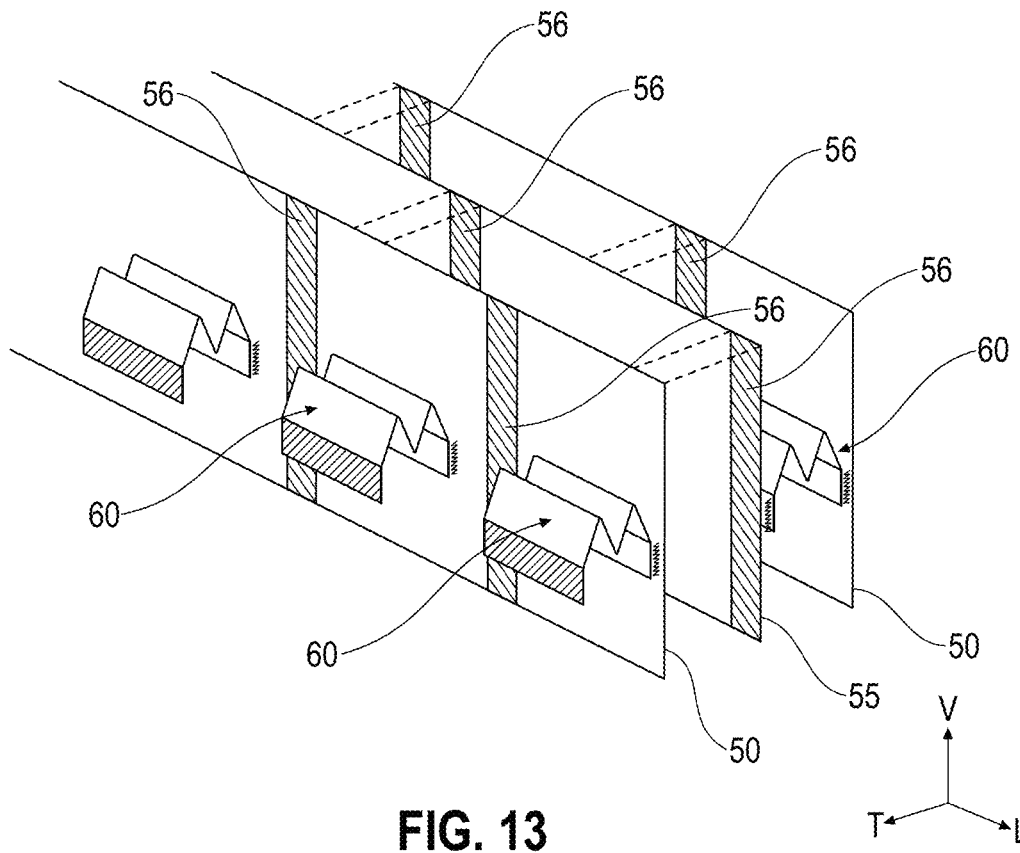
FIG. 13 schematically illustrates another example of attaching the ribbon to the plates.

In a second embodiment illustrated in FIG. 13, the ends of the ribbon are limited between two successive nodal areas connecting the first plate 50 to the second plate 55. In other words, no ribbon extends through the nodal portions of the first plate 50 or of the second plate 55. The ribbons are then attached in each cell of the honeycomb material after the honeycomb material has been deployed.

These two embodiments can be present in the same core according to the invention.

The forming is carried out by applying a tensile force (illustrated by arrows F1 and F2 in FIG. 4) to the plates attached to each other (along the direction T), this tensile force tending to move the plates away from each other. This tensile force, combined with the bonding of the plates by nodal portions and the deformability of the plates, allows the plates to be shaped to form the cells of the honeycomb core. The spreading of the plates causes the free portions 64 of the ribbon or ribbons 60 or septa to deploy. This can be accentuated after the cells have been shaped, by applying a tensile force to these free portions (in the direction T) so as to deploy the septa 45, 46 in the respective cells.

Figure 4:
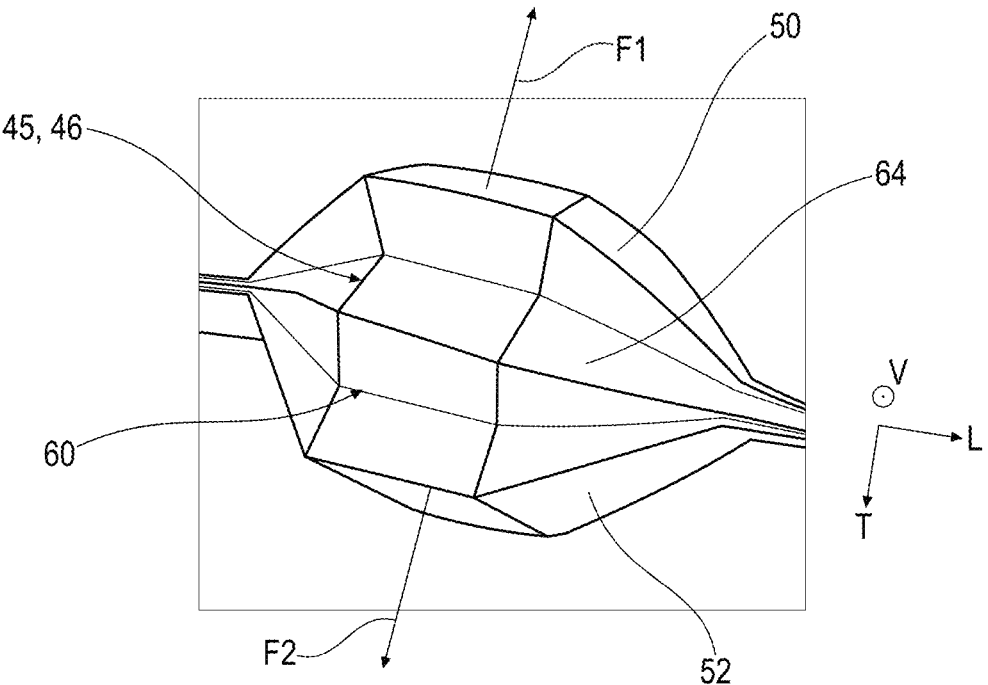
FIG. 4 schematically illustrates a top view of a cell during a forming step.

FIG. 4 schematically illustrates the forming step during the deployment of the free portions 64 forming a septum by applying tensile forces along the arrows F1 and F2 to the first and second plates 50, 55.

Figure 5:
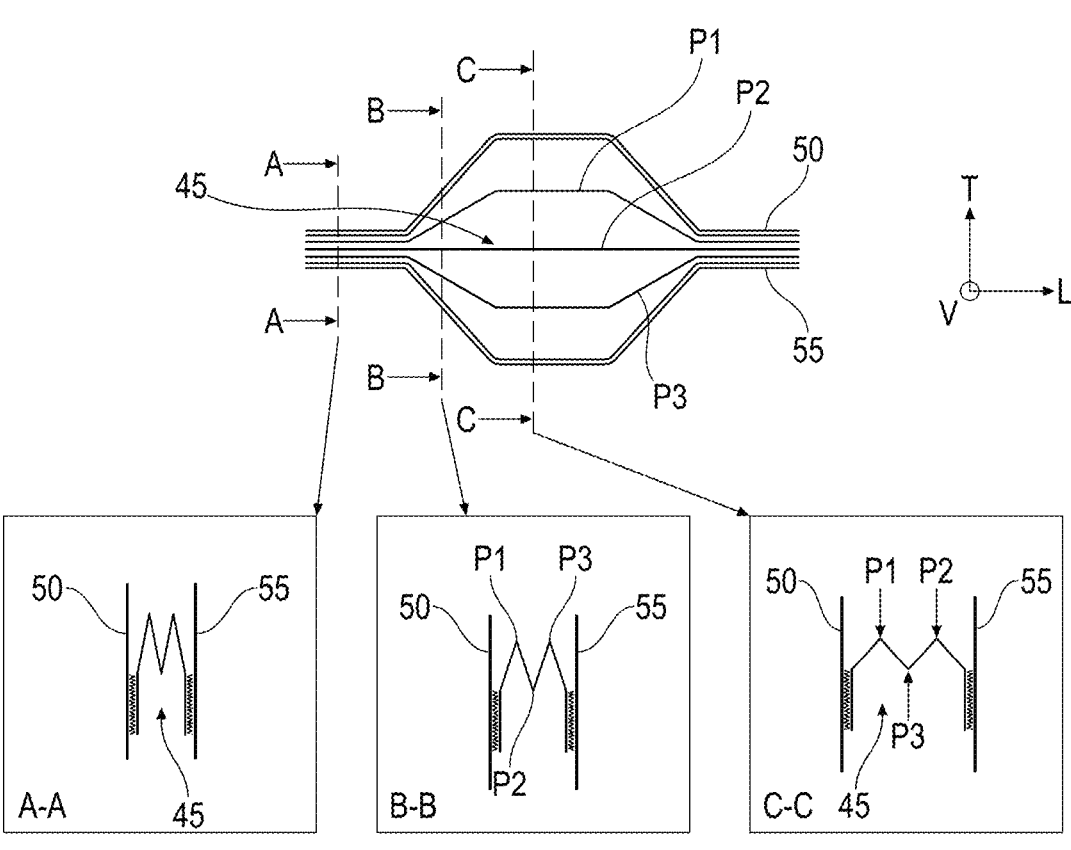
FIG. 5 is a top view of a cell of the honeycomb core in its expanded position and expanded cross-sectional views thereof.

FIG. 5 shows a top view of a cell 36 of the expanded honeycomb core, i.e., after the forming step, as well as cross-sectional views of the assembly and in particular of the deployed septum in:

a plane A-A passing through nodal portions of the first and second plates 50, 55. In this area where the nodal portions of the plates 50, 55 are attached, all the folds P1, P2 and P3 of the septum are glued to the nodal portions of the two plates 50, 55 so that they remain connected when the cell expands.

in a plane B-B passing through an area in which the lateral walls of the cell flare and in which the septum 45 begins to deploy, and in a plane C-C passing through a central area of the cell containing the main axis of the cell 36, illustrating a maximum deployment of the septum 45.

The lengths of the W-shaped folds must be such that the total free length 64 is equal to or greater than the maximum distance between two plates obtained by expansion.

In one embodiment, the septa of the same cell are independent of each other. In particular, for each pair of consecutive septa (in the height orientation, i.e., along the vertical direction V), the two consecutive septa are independent of each other. For the purposes of the invention, two consecutive septa in the same cell are said to be independent if they are formed from two distinct ribbons, as illustrated in FIGS. 7 and 8 and in contrast to FIGS. 9 and 10.

With reference to the examples shown in FIGS. 7 and 8, each septum 45, 46 comprises a first attachment leg attached to a non-nodal portion of the first plate and a second attachment leg attached to a non-nodal portion of the second plate.

More specifically, the first septum 45 comprises a first attachment leg 62A attached to a non-nodal portion of the first plate 50 and a second attachment leg 62B attached to a non-nodal portion of the second plate 55. The second septum 46, consecutive to the first septum 45 in the cell in question, comprises a first attachment leg 62C attached to a non-nodal portion of the first plate 50 and a second attachment leg 62D attached to a non-nodal portion of the second plate 55.

The first attachment legs 62A, 62C and the second attachment legs 62B, 62D of the septa 45, 46 all extend towards one end of the associated cell, i.e., either towards the first skin wall 31 or towards the second skin wall 32.

According to the example shown in FIG. 7, each septum 45, 46 is offset along the main axis A, which is parallel to the vertical direction V according to the example shown, with respect to its first attachment legs 62A, 62C and its second attachment legs 62B, 62D.

In other words, the mean plane P of the septa does not pass through the attachment legs 62A, 62C, 62B, 62D of the septa 45, 46. As a reminder, the mean plane P is defined so that the folds P1, P2 and P3 alternate on either side of this plane and are located at equal distances from it.

Alternatively, and with reference to the example shown in FIG. 8, each septum 45, 46 extends transversely between its first attachment leg 62A, 62C and its second attachment leg 62B, 62D. This configuration is known as a hat configuration.

In other words, the mean plane P of the septa passes through the attachment legs 62A, 62C, 62B, 62D of the septa 45, 46.

Figure 10:
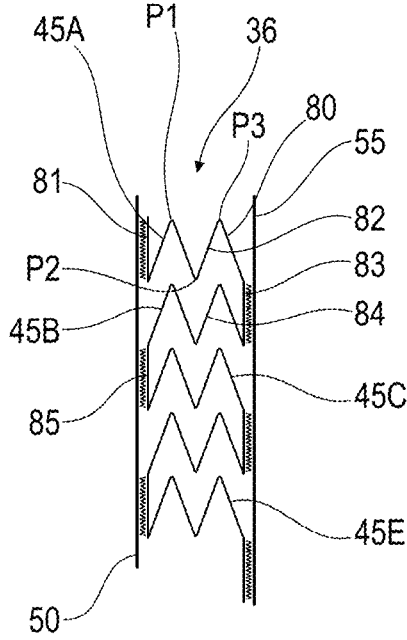
FIG. 10 is a cross-sectional view of another example of a cell equipped with two septa according to the invention.

In other embodiments, the septa of the same cell can be dependent on each other, at least when taken in pairs. For the purposes of the invention, two consecutive septa in the same cell are said to be dependent if they are formed from the same ribbon or from the same additional plate, as illustrated in FIGS. 9 and 10. In this case, the septa are coupled to one of the first or second plates 50, 55 by the same attachment leg.

According to the example shown in FIG. 9, the cell 36 comprises an additional ribbon 70 arranged between the first and second plates 50, 55 and attached to the first and second plates. The additional ribbon 70 is shaped to form at least two consecutive septa 45, 46.

The additional ribbon 70 comprises in succession:

a first portion glued 71 to the first plate 50 and forming a first attachment leg 62A for attaching the first septum 45 to a non-nodal portion of the first plate 50, a first adjacent portion 72 folded along three fold lines P1, P2 and P3 to form the free W-shaped portion of the first septum 45, a second portion glued 73 to the second plate 55 and continuously forming a second attachment leg 62B for attaching the first septum 45 and a first attachment leg 62D for attaching the second septum 46 to a non-nodal portion of the second plate 55, a second adjacent portion 74 folded along three fold lines P4, P5, P6 to form the free W-shaped portion of the second septum 46, and a third portion glued 75 to the first plate 50 and forming a second attachment leg 62C for attaching the second septum 46 to a non-nodal portion of the first plate 50.

The septa 45 and 46 are thus arranged "head to tail" or "in opposition", i.e., the fold lines P2 and P5 are very far apart, while the fold lines P3 and P4 on the one hand and P1 and P6 on the other are very close together.

In a variant not shown, the additional ribbon 70 has a closed tubular cross-section. In other words, this variant differs from FIG. 9 in that the first glued portion 71 and the third glued portion 75 are formed from continuous material and are therefore glued together to form a single attachment leg for attaching the first septum 45 and the second septum 46 to a non-nodal portion of the first plate 50.

Advantageously, this solution protects the lines P1, P3, P4 and P6 from any glue burrs from the bonding of the ribbon 70 to the plates 50 and 55, thus not hindering the deployment of the cells and the W when the core expands as a result of the forces F shown in FIG. 4.

The example shown in FIG. 10, referred to as the "zigzag" configuration, differs from that of FIG. 9 in that the additional ribbon 80 comprises a succession of portions glued alternately to the first plate 50 or to the second plate 55 and portions folded along three fold lines P1, P2, P3, each intended to form the free W-shaped portion of a septum.

In the example shown, the additional ribbon 80 allows to form five consecutive septa.

The additional ribbon 80 comprises in succession:

a first portion 81 glued to the first plate 50 and forming a first attachment leg for attaching a first septum 45A to a non-nodal portion of the first plate 50, a second portion 82 adjacent and folded along three fold lines P1, P2 and P3 to form the free W-shaped portion of the first septum 45A, a third portion 83 adjacent to and glued to the second plate 55 and forming a common attachment leg for attaching the first septum 45A and a second septum 45B (consecutive to the first) to a non-nodal portion of the second plate 55, a fourth portion 84 adjacent and folded along three fold lines to form the free W-shaped portion of the second septum 45B, a fifth portion 85 adjacent to and glued to the first plate 50 and forming a common attachment leg for attaching the second septum 45B and a third septum 45C (consecutive to the second) to a non-nodal portion of the first plate 50, and so on until the fifth septum 45E is formed and attached.

Figure 11:
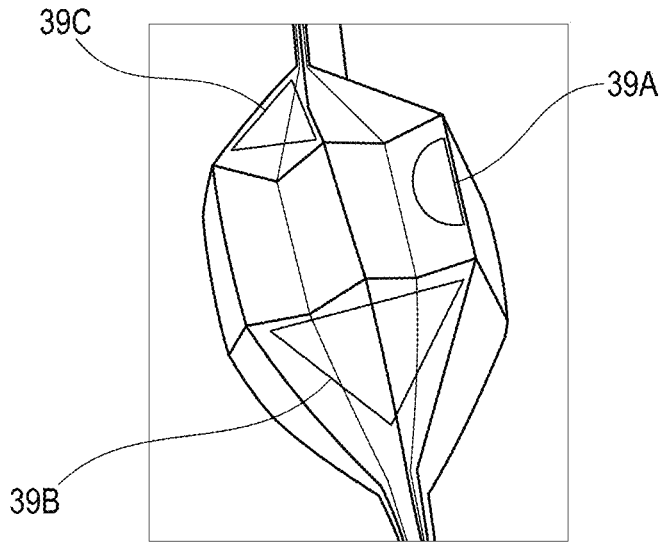
FIG. 11 schematically illustrates a top view of a cell and various positions of the orifices of the septum.

FIG. 11 illustrates different possible positions of through-orifices 39A, 39B, 39C in the septum of FIG. 4 for the passage of the sound waves. The orifice 39A is located in the area of greatest deployment of the septum. The orifices 39B and 39C are made in the widening portion of the cell.

The positions of the orifices in the successive septa of the same cell are preferably arranged to maximise the free path to be travelled by the sound wave. It is therefore preferable to combine a succession of orifices in position 39A by alternating the proximity plate at each septum, the first plate 50 and then the second plate 55.

In another embodiment, orifices in a first position 39C can be combined with orifices in a second position 39A, or a single type of position, while alternating the nodal area near the orifice from one septum to another.

Preferably, the orifices have a cross-section of at least 2 mm$^2$, even more preferably at least 4 mm$^2$, and a smaller width of at least 1 mm and preferably at least 2 mm, the width being the dimension of the orifice in the transverse direction. In other words, the width is the small diameter of an elliptical orifice, the width of a rectangular orifice, or the diameter of the inscribed circle in a triangular orifice.

Preferably, the orifices are arranged as close as possible to the attachment legs, i.e., as close as possible to the plates 50, 55 delimiting the cell, so as to maximise the distance between two free orifice edges of two successive septa, thus maximising the length of the path to be travelled by the sound wave.

Some of the septa in a single acoustic attenuation cell or panel may comprise a permeable material over the entire transverse cavity surface or over a portion of the transverse cavity surface to form acoustic septa creating a 2DOF (2-Degrees Of Freedom) or 3DOF (3-Degrees Of Freedom) functionality.

FIG. 14 illustrates an example of embodiment of a cell of a core according to the invention comprising three septa offset radially with respect to the main axis A (here vertical) to form a baffle for the propagation of the sound waves and thus create a 2DOF functionality. In the example shown:

the top septum 46A is acoustically transparent at least partially and over its entire surface, the middle 46B and bottom 46C septa are acoustically opaque and each has an orifice 39. The orifices 39 are offset from each other in a direction perpendicular to the vertical axis V (here transverse T) to form a baffle for the propagation of the sound waves.

FIG. 15 illustrates another example of embodiment of a cell of a core according to the invention comprising three septa offset radially with respect to the main axis A (here vertical) to form a baffle for the propagation of the sound waves and thus create a 2DOF functionality. In the example shown:

the top septum 46A is acoustically opaque except for an area Z which is at least partially acoustically transparent, the middle 46B and bottom 46C septa are acoustically opaque and each has an orifice 39.

The orifices 39 and the area Z are offset from one another in a direction perpendicular to the vertical axis V (here transverse T) to form baffles for the propagation of the sound waves. There are three acoustically opaque areas (one per septum) arranged in a baffle pattern to maximise the path of the acoustic waves.

FIG. 16 illustrates another example of embodiment of a cell of a core according to the invention comprising three septa offset radially with respect to the main axis A (here vertical) to form a baffle for the propagation of the sound waves and thus create a 3DOF functionality. In the example shown:

the top septum 46A is acoustically transparent at least partially and over its entire surface, the middle septa 46B and 46C are acoustically opaque and each has an orifice 39, the bottom septum 46D is acoustically opaque except for an area Z which is at least partially acoustically transparent.

The orifices 39 and the area Z are offset from one another in a direction perpendicular to the vertical axis V (here transverse T) to form baffles for the propagation of the sound waves. There are three acoustically opaque areas arranged in baffles to maximise the path of the acoustic waves.

The invention claimed is:

1. A core for an acoustic attenuation panel extending between a first and a second end faces, said core comprising a plurality of tubular polygonal cells having a main axis of extension between the end faces, each cell comprising an internal cavity delimited by lateral walls extending between the first and second end faces and opening out into each of the two end faces, the cells being expandable in a direction parallel to the end faces, each polygonal cell comprising septa extending transversely relative to the main axis of the associated cell and being offset along the main axis, wherein each septum is folded in a W-shape at least between one of the lateral walls and another of the lateral walls and has a through orifice, the orifices of two consecutive septa being offset radially with respect to the main axis to form a baffle.

2. The core according to claim 1, wherein each polygonal cell is formed from a first plate and a second plate attached together by nodal portions, and the septa each extend through the nodal portions of the first and second plates.

3. The core according to claim 2, wherein two consecutive septa are independent of each other.

4. The core according to claim 1, wherein each septum comprises a first attachment leg attached to a non-nodal portion of the first plate and a second attachment leg attached to a non-nodal portion of the second plate, the first and second attachment legs each extending towards an end of the associated cell.

5. The core according to claim 4, wherein each septum extends transversely between its first attachment leg and its second attachment leg.

6. The core according to claim 4, wherein each septum is offset along the main axis with respect to its first and second attachment legs.

7. The core according to claim 2, comprising an additional ribbon arranged between the first and second plates, attached to the first and second plates and shaped to form at least two consecutive septa.

8. The core according to claim 7, wherein two consecutive septa are formed from an additional ribbon, said additional ribbon comprising:

a first portion glued to the first plate and forming a first attachment leg for attaching a first of the septa to a non-nodal portion of the first plate, a first adjacent portion folded along three fold lines, a second portion glued to the second plate and continuously forming a second attachment leg for attaching the first septum and a first attachment leg for attaching the second of the septa to a non-nodal portion of the second plate, a second adjacent portion folded along three fold lines, and a third portion glued to the first plate and forming a second attachment leg for attaching the second septum to a non-nodal portion of the first plate.

9. The core according to claim 7, wherein the additional ribbon is shaped to form consecutive septa in a continuous manner, the additional ribbon comprising a succession of portions glued alternately to the first plate or to the second plate and portions folded along three fold lines.

10. The core according to claim 1, wherein at least one of the septa comprises at least one segment of acoustically permeable material.

11. An acoustic attenuation panel for a turbomachine comprising a first skin wall, a second skin wall and a core according to one of the preceding claims, the core being arranged between the first and second skin walls and secured to at least one of the skin walls, the first skin wall being acoustically permeable and the second skin wall being acoustically opaque.

12. The acoustic attenuation panel according to claim 11, wherein the core is secured to the first skin wall and to the second skin wall.

13. A turbomachine for an aircraft propulsion assembly, comprising at least one acoustic panel according to claim 11.

* * * * *